United States Patent [19]

Grimaud et al.

[11] 3,870,691

[45] Mar. 11, 1975

[54] METHOD FOR POLYMERIZING TETRAFLUOROETHYLENE AND THE POLYMERS OBTAINED THEREFROM

[75] Inventors: Edouard Grimaud, Oullins; Claude Tournut, Saint Genis Laval, both of France

[73] Assignee: Pechiney Ugine Kuhlmann, Paris, France

[22] Filed: Sept. 8, 1972

[21] Appl. No.: 287,255

[30] Foreign Application Priority Data
Sept. 13, 1971  France .............................. 71.32874

[52] U.S. Cl. .......................................... 260/92.1
[51] Int. Cl. .............................................. C08f 3/24
[58] Field of Search .................. 260/92.1 R, 92.1 S

[56] References Cited

UNITED STATES PATENTS

| 2,593,583 | 4/1952 | Lontz | 260/92.1 S |
| 3,245,972 | 4/1966 | Anderson et al | 260/92.1 R |

*Primary Examiner*—Harry Wong, Jr.
*Attorney, Agent, or Firm*—Pennie & Edmonds

[57] ABSTRACT

This invention relates to a method for polymerizing tetrafluoroethylene in suspension comprising initiating polymerization with a previously prepared tetrafluoroethylene polymer, in the absence of any other polymerization initiating agent.

This invention also relates to the powdered polytetrafluoroethylene prepared by the above method.

5 Claims, No Drawings

METHOD FOR POLYMERIZING TETRAFLUOROETHYLENE AND THE POLYMERS OBTAINED THEREFROM

BACKGROUND OF THE INVENTION

I. Field of the Invention

This invention relates to the field of polymerizing tetrafluoroethylene (hereinafter referred to as TFE) and includes the powders of tetrafluoroethylene polymers (hereinafter referred to as PTFE) produced thereby.

II. Description of the Prior Art

According to known and conventional methods, TFE is generally polymerized in the presence of water, a polymerization initiator capable of forming free radicals under the conditions of polymerization, a buffering agent, and optionally, a more or less significant quantity of an emulsifier according to whether one desires a dispersion or a suspension of PTFE.

In the case of polymerizing PTFE in suspension, it is particularly difficult to obtain a powder possessing good flow properties, a high apparent density, and a low tendency to agglomerate and adhere to the walls of the reactors employed for polymerization. Such powders can be obtained according to certain known methods but generally to the detriment of the intrinsic properties of the polymer, in particular, its molecular weight and its mechanical properties.

Moreover, in the method wherein a small quantity of fluorinated emulsifier is added to the aqueous phase of the polymerization medium in order to improve the wettability of the powder, the mother liquor always contains a relatively significant quantity of PTFE in the form of an emulsion which is not recoverable and gives rise to an appreciable loss of product.

Finally, the powders obtained according to the known and conventional methods have a rather coarse appearance and must be subjected to at least one grinding operation in order to be useful for molding which consists in molding a preform under pressure and then sintering the latter, for example, by passage through an electrical oven.

Moreover, in the use of PTFE powders a high rate of producing identical pieces with minimum manual intervention is sought. According to the particular case, either automatic molding or extrusion processes are employed.

In the case of molding processes, the PTFE powders obtained from a simple grinding of the polymer prepared in suspension according to known and conventional techniques generally are unsuitable for the automatic refilling of the molds because of their poor flow properties. The different methods which have been proposed to improve the flow properties of PTFE consist in grinding the PTFE powder to a very fine particle size and then reagglomerating the powder in the presence of a solvent thus forming spherical particles which flow fairly well. The various operations of grinding, reagglomerating the powder and eliminating the solvent are expensive and involve risks of contamination to the PTFE.

In order to be useful for granular extrusion techniques which consist in extruding the PTEE through PTFE elongated die heated above the melting point of the PTFE, the powders of PTFE prepared by the known processes require a presintering step, which is to say, a heating of the powder to above 327°C in such a fashion as to partially sinter the powders of PTFE. This operation is both cumbersome and delicate.

In this way, the known methods for polymerizing PTFE in suspension result in rather significant losses of end product and coarse powders which must be subjected to numerous finishing operations before being capable of use in the current processes of manufacturing finished or semi-finished articles of PTFE.

It is known to polymerize TFE in suspension in the presence of already formed PTFE but in all such processes, the PTFE-TFE mixture is subjected either to the effect of ionizing radiations such as disclosed in British Pat. No. 1,199,312 or to the action of free radicals formed by the decomposition of an initiating agent in the reaction medium resulting from a continuous polymerization as in French Pat. No. 1,321,411, or specially added as in French Pat. No. 1,363,534.

SUMMARY OF THE INVENTION

It has been very surprisingly discovered that PTFE powders can be prepared by initiating polymerization in suspension of TFE with a previously prepared polymer of TFE in the absence of any other initiating agent.

The method of this invention occurs as if the polymer of TFE (which will be hereinafter designated as the polymerization initiating polymer) retains a sufficient number of reactive sites to permit initiation of polymerization.

This fact is not very astonishing in the case where the polymer is handled in the absence of oxygen. It has actually been shown that under these conditions free radicals can be detected in the PTFE after polymerization (S. SHERRAT - KIRK -OTHMER - Encyclopedia of Chemical Technology Second Edition - Vol. 9 - page 813 - Interscience Publishers - New York).

It is therefore normal that such PTFE handled in the absence of oxygen can initiate the polymerization of PTFE. On the other hand, it is very surprising that the result can be the same in the handling of the polymer in the presence of oxygen.

It is scarcely practical from an industrial viewpoint to handle powders of PTFE in the absence of oxygen, it being much easier to handle the powders in air. The initiating polymer of this invention can be agitated in water in the presence of air. It can be stored in the presence of air for several days without the need for special precautions, its activity for initiating polymerization undergoing scarcely any diminution. The initiating polymer can also be dryed upon the condition, however, that this drying be accomplished by a current of air or under reduced pressure at a sufficiently low temperature.

DESCRIPTION OF THE PREFERRED EMBODIMENTS

It has been observed that polymerization of TFE in suspension initiated with a PTFE polymerization initiator according to this invention can be carried out at the same temperature or advantageously, at a temperature which is greater than that used for the preparation of the polymerization initiator. In practice, a difference of from about 15° to 20°C between these two temperatures results in a good rate of polymerization.

The temperature of polymerizing TFE according to this invention can be selected from between a range of from about 20° to 100°C and a pressure between 1 and 100 bars, and advantageously, between 2 and 30 bars.

The lower pressures lead to rather slow rates of polymerization whereas the higher pressures provide much greater productivities requiring, however, more pressure-resistant apparatus.

The reaction medium advantageously comprises deminerlized and deaerated water which, however, does not contain any other initiating agent. It is unnecessary to add buffering or emulsifying agents. However, the addition of a small quantity of an alkaline or ammonium salt of a weak acid to the reaction medium does not modify the course of polymerization and permits the maintenance of a neutral or only slightly alkaline medium which has been found to be advantageous.

While it is possible to employ as the initiating polymer a PTFE obtained according to known and conventional methods of suspension polymerization, the advantages of carrying out the method of this invention are especially evident in using as a polymerization initiator, a PTFE powder obtained from the coagulation of PTFE prepared by polymerizing PTFE in an emulsion. In this type of polymerization method, the use of a polymerizing initiator, a buffering agent and a perfluorinated emulsifier results in the production of dispersions wherein the individual particles measure from about 0.1 to about 0.5 micron. These dispersions can be coagulated, for example, by agitation in a vessel equipped with counter rotating blades. The concentration of the dispersion at the time of coagulation, the speed of agitation and the temperature are factors which as is clear to one skilled in the art, can be adjusted to regulate the particle size of the powder formed.

The polymerization of TFE in suspension according to the method of this invention leads to an enlargement of the particles of the polymerization initiator without the formation of new particles. It is thus possible to directly obtain a powder having a particle size which is convenient for use without having to be first ground. Since there is a complete absence of polymerization in the aqueous phase, the only polymerization possible is that on the existing particles. Not even a trace of polymer is lost in the mother liquor and the remaining particles are well separated and have no tendency to adhere to the walls of the autoclave. The reaction vessels employed for the polymerization method of this invention after being emptied can be reused after a simple rinsing with water. The washed and dryed PTFE powder possesses excellent flow properties and can be used in the automatic charging of molds or in feeding powder extruders without first having to be subjected to a treatment of grinding, reagglomeration or presintering. The PTFE powders obtained by using as the polymerization initiator, the PTFE resulting from suspension polymerization according to this invention, are not subject to any loss in the mother liquor, do not adhere to the walls of the autoclave and have improved mechanical properties but should be ground before being used.

Another characteristic of the PTFE powders obtained according to this invention relates to their specific surface. The fine powders usually obtained through coagulation of dispersions of PTFE have specific surfaces measured according to the nitrogen absorption method (B.E.T. method) in the range of about 10 $m^2/gm$ whereas the powders obtained from known and conventional methods of suspension polymerization result in rather low specific surfaces generally less than 3 $m^2/gm$.

The PTFE powders obtained according to the method of this invention have specific surfaces which can be considerably varied, for example, within the range from about 1 – 8 $m^2/gm$. It has actually been observed that when the ratio R of the weight of the final polymer to the weight of the polymerization initiating polymer is increased, the specific surface of the final polymer is diminished thus the latter can be determined in advance by maintaining a desired ratio R. The ratio R can be varied in several ways: by always using the same quantity of polymerization initiator and varying the quantity of polymerized TFE or polymerizing a given quantity of TFE but varying the initial quantity of polymerization initiator, the increase in quantity of the latter leading to an increase in the rate of polymerization. The rate of polymerization can also be increased by increasing the pressure as well as the temperature of polymerization and especially increasing the difference between the temperature at which the polymerization initiator is prepared and that of polymerizing the TFE in suspension.

The following examples are illustrative of the method and polymers of this invention:

EXAMPLE 1

I. Preparation of a Polymerization Initiating Polymer by Polymerization in an Emulsion A dispersion of PTFE is prepared by successively introducing the following ingredients into a conventional stainless steel polymerization reactor:

| Quantities | Component |
| --- | --- |
| $10^6$ parts | water |
| 50,000 parts | paraffin oil |
| 25 parts | potassium persulfate |
| 37.5 parts | Mohr's salt ($FeSO_4.(NH_4)_2SO_4.6H_2O$) |
| 300 parts | sodiumpyrophosphate |
| 3,400 parts | sodiumperfluoroctanoate |
| | TFE |

The pressure of the TFE was maintained at a level of 20 to 22 bars and the temperature was kept at 15° to 22°C.

Polymerization was stopped when the concentration of PTFE reached a level of 27 percent.

A portion of this dispersion was agitated in an apparatus equipped with counter rotating blades. After 5 minutes, a powder was obtained which possessed a mean particle size after drying according to ASTM method D 1,457 – 69 of 370 microns.

II. Preparation of Polytetrafluorethylene $10^6$ parts of water and 70,000 parts of the powder prepared as in (I) were introduced into a stainless steel autoclave. After purging the atmosphere in the autoclave, TFE was introduced under a pressure of 22 bars. The temperature was increased to 40°C and agitation was begun leading to a diminution in pressure signalling the start of polymerization. The pressure was kept between 20 to 22 bars and the temperature increased from 40° to 65°C. Polymerization was stopped after 67 minutes during which 200,000 parts of PTFE had formed for a mean polymerization rate of 180 grams per hour per liter of water employed.

The polymer, which was separated by filtration, appeared in the form of well separated spherical particles resisting any tendency for agglomeration or sticking to the walls of the polymerization reactor. Moreover, the mother liquor was perfectly clear and contained no trace of polymer.

The mean particle size of the PTFE powder thus obtained was 500 microns and its apparent density was 0.844 gm/cm³.

The flow characteristics of such a powder were determined by using the ASTM D 1895-61 T method which consists in measuring the time required for one pound of powder to flow through a given funnel. The PTFE polymer completely flowed out within 19 seconds while commercial products prepared by reagglomerating fine powder flowed out in a time of from 17 to 22 seconds and a PTFE powder which was simply ground after suspension polymerization did not flow at all.

In a powder extrusion experiment using a cylinder of 14 millimeters diameter with a die 1 meter long heated to 370°C, the PTFE prepared according to this invention gave a smooth, faultless cylinder at an extrusion rate of 2.8 m/hr. while a presintered powder prepared according to a known method gave a slightly rough-surfaced piece under the same conditions.

EXAMPLE 2

The dispersion described in (I) of EXAMPLE 1 was coagulated under different conditions so as to provide a powder having a mean particle size of 740 microns. This powder was used as in (II) of EXAMPLE 1, and under these conditions, the polymerization temperature varied from 45 to 82°C.

After 37 minutes of polymerization, 250,000 parts of polytetrafluorethylene, corresponding to a mean polymerization rate of 410 grams per liter per hour were recovered. The polymer obtained in this fashion had a mean particle size of 1,250 microns and a density of 0.864 g/cm³.

EXAMPLE 3

I. Preparation of a Polymerization Initiating Polymer by Polymerization in an Emulsion.

A dispersion fo PTFE was prepared employing the following reaction ingredients within a conventional type reactor;

| Quantities | Component |
| --- | --- |
| 10⁶ parts | water |
| 50,000 parts | paraffin oil |
| 200 parts | ammonium persulfate |
| 2,500 parts | ammonium perfluoroctanoate TFE |

The pressure of TFE was maintained at a level of 20 to 22 bars and the temperature at 57 ± 1°C. Polymerization was continued until the concentration of PTFE in the dispersion reached 31.2 percent.

A portion of this dispersion was coagulated by mechanical agitation and the powder thus obtained was washed with distilled water.

II. Preparation of Polytetrafluorethylene

Proceeding substantially the same as in (II) of EXAMPLE 1 with the exception that the temperature was increased to 78°C at the beginning of polymerization, finally reaching 92°C at the end of polymerization (78 minutes), 62,000 parts of polymer were formed for a mean polymerization rate of 47 grams per hour per liter of water.

EXAMPLE 4

This example demonstrates the influence of the quantity of polymerization initiating polymer employed and of the temperature of the polymerization upon the polymerization rate as well as the influence of the ratio R (ratio of weight of final polymer to weight of polymerization initiating polymer) upon the specific surface of the polymer.

The polymerization initiating polymer was prepared substantially the same as in (I) of EXAMPLE 1 except at a temperature of 15° to 35°C. The specific surface of the polymer was 10.6 m²/gm.

By varying the quantity of polymerization initiating polymer, the temperature of polymerization and the quantity of polymerized TFE as indicated in (II) of EXAMPLE 1, the results set forth in the following table were obtained. These results show that with the same weight of polymerization initiating polymer, the rate of polymerization increases with the temperature of polymerization whereas at the same temperature the rate of polymerization increases with the weight of polymerization initiating polymer employed and lastly, that the specific surface of the powders varies in inverse proportion to the ratio R.

| Weight of Polymerization Initiating Polymer (gm) | Temperature Degrees C | Polymerization Rate in Grams Per Liter Per Hour | Ratio R | Specific Surface in m²/gm |
| --- | --- | --- | --- | --- |
| 1,500 | 54 – 62 | 157 | 2.6 | 1.7 |
| 1,500 | 61 – 64 | 355 | 2.33 | 2.3 |
| 2,000 | 60 – 64 | 475 | 1.85 | 3.1 |
| 3,000 | 61 – 69.5 | 2,150 | 1.70 | 4.2 |
| 3,000 | 50 | 108 | 1.40 | 6.1 |

EXAMPLE 5

A dispersion of PTFE was prepared in a manner substantially similar to that of EXAMPLE 1, (I). On the next day, the polymer was coagulated to provide a polymerization initiating polymer. A portion of the latter was employed two days later to initiate a suspension polymerization at 52°C under a pressure of 8 to 6 bars. The rate of polymerization was 138 grams per liter per hour. Another portion of the polymer was stored for a week in the presence of air at a temperature of about 20°C and was then used to initiate polymerization in a manner substantially similar to the aforementioned polymerization. The rate of polymerization was 110 grams per liter per hour representing only a slight diminution in the rate of polymerization.

EXAMPLE 6

I. Preparation of a Polymerization Initiating Polymer by Suspension Polymerization The following reaction components were introduced into a stainless steel autoclave equipped with an agitator:

| Quantity | Component |
| --- | --- |
| 10⁶ parts | water |
| 10 parts | potassiumpersulfate |
| 15 parts | Mohr's salt |
| 700 parts | sodiumpyrophosphate |
| 25 parts | sodiumperfluoroctanoate |

The temperature was maintained at 20°C and the TFE was introduced in successive charges to yield 240,000 parts of TFE. The autoclave was then emptied. The polymer appeared in the form of apparently spherical agglomerates of about 3 millimeters diameter.

II. Preparation of Polytetraflourethylene $10^6$ parts of water, 60,000 parts of the polymer prepared in (I) and TFE under a pressure of about 6 to 8 bars were introduced into the same autoclave. The temperature was maintained at 40°C and the polymerization was continued until 260,000 parts of PTFE having the same appearance as the polymerization initiating polymer but with much heavier grains of about 4 millimeters diameter were obtained.

The same experiment was repeated 12 days later, the polymerization initiating polymer being kept exposed to air. The same results were obtained with the exception that the rate of polymerization was twice as slow. In the second case, the final polymer had a resistance at the elastic limit greater than 20 bars compared to the polymerization initiating polymer.

We claim:

1. A method for polymerizing tetrafluoroethylene in an aqueous suspension comprising initiating polymerization in the absence of any other polymerization initiating agent with a tetrafluoroethylene polymer initiator previously prepared by coagulation of a dispersion of polytetrafluoroethylene being about 0.1 to about 0.5 microns obtained by polymerization of tetrafluoroethylene in an emulsion.

2. The method according to claim 1 wherein the polymerization temperature is more than about 15° to 20°C higher than the temperature at which the polymerization initiating polymer is prepared.

3. A method according to claim 1 wherein the polymerization temperature is from about 20° to 100°C.

4. The method according to claim 1 wherein polymerization is carried out at a pressure from about 2 to 30 bars.

5. The method according to claim 1 wherein polymerization is carried out in the presence of an alkaline or ammonium salt of a weak acid.

* * * * *